Aug. 9, 1938.     D. C. HINDS     2,126,387
LOADING DEVICE
Filed Nov. 8, 1937     2 Sheets-Sheet 1
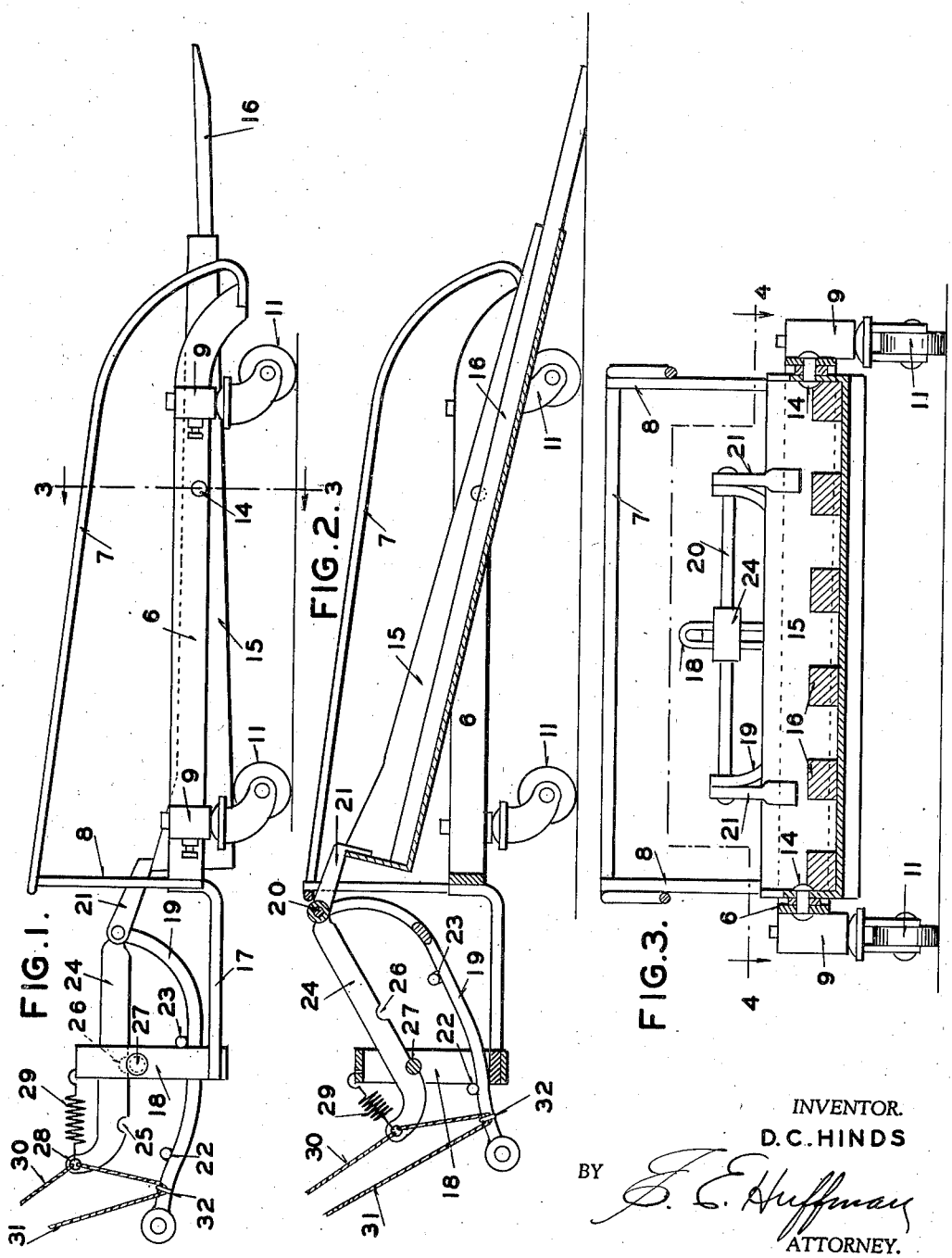
INVENTOR.
D. C. HINDS
BY
ATTORNEY.

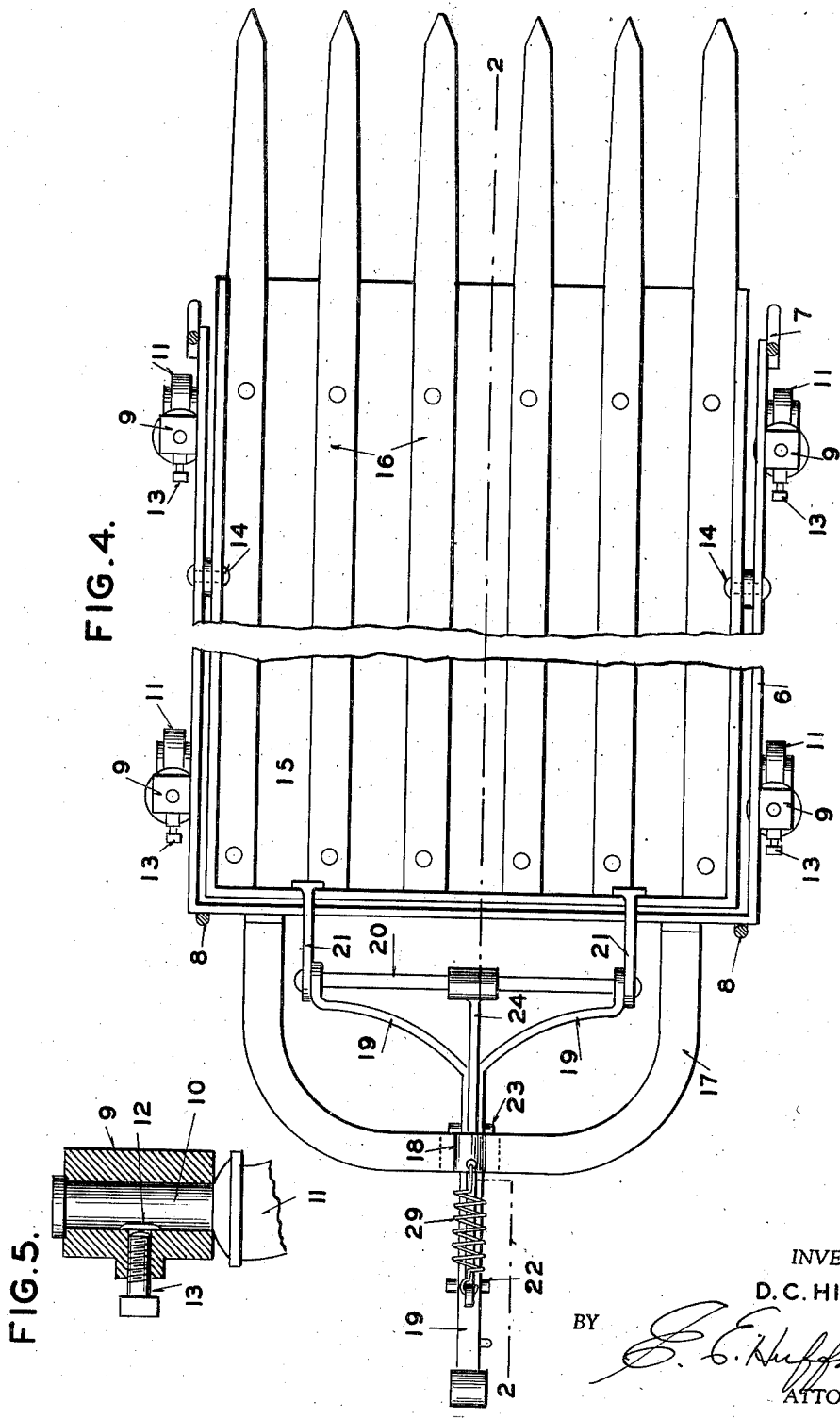

Patented Aug. 9, 1938

2,126,387

UNITED STATES PATENT OFFICE 2,126,387

LOADING DEVICE

Daniel C. Hinds, Vandalia, Ill.

Application November 8, 1937, Serial No. 173,315

5 Claims. (Cl. 214—81)

My invention relates to a loading device and in the specific form shown is especially adapted for handling hay or grain, either in the form of bundles or shocks or in windrows. It may, however, either with or without modification, be employed in the handling and transportation of various kinds of material. While any suitable motive power may be used to propel the device, I prefer to attach it to a motor tractor in a manner similar to a trailer.

One of the objects of my invention is to provide means whereby the tilting of the loading platform in the loading and unloading operation is automatically secured by reversal of the direction in which the device is propelled.

Another object of my invention is to provide a device which may be turned in a small space, thus adapting it to the special conditions which are likely to be encountered when loading and unloading in the field.

In the accompanying drawings, which illustrate one form of loading device made in accordance with my invention, Figure 1 is a side elevation; Figure 2 is a longitudinal section taken on the line 2—2 of Figure 4; Figure 3 is a cross section taken on the line 3—3 of Figure 1; Figure 4 is a horizontal section taken on the line 4—4 of Figure 3; and Figure 5 is a sectional view showing the caster locking means.

The frame of my device is U-shaped in form and comprises a lower member 6 and an upper member 7 directly connected at their rear ends and spaced apart at their forward ends by uprights 8. Carried on the lower frame member 6 are four bearing blocks 9 in which are journaled the vertical trunnions 10 of the caster wheels 11. Each of the trunnions 10 is provided with a flat face 12 (Figure 5) adapted to be engaged by the end of a set-screw 13. When the end of the screw is withdrawn from the face, as shown in Figure 5, the wheel is free to function as a caster wheel. If, however, the screw is moved into contact with the face, the trunnion is locked so that the wheel acts as an ordinary wheel.

Mounted in the frame by pivots 14 is the loading platform comprising a tray 15, preferably of sheet metal, and a number of rake teeth 16 secured to the bottom of the tray and projecting a considerable distance beyond its open rear end. This platform is adapted to be swung either into hauling position, as shown in Figure 1, or into loading position, as shown in Figure 2. While the hauling position may be horizontal, I prefer it to be slightly inclined as shown, the rear end of its bed being somewhat higher than the front end. This slight inclination, together with the known tendency of a load to travel forward on a moving vehicle, will insure the retention of the load during transportation.

Secured to the front end of the frame is a support 17 having a central U-shaped post 18 forming a guide-way for the tractor bar 19 by means of which the device is attached to the motor tractor by which it is propelled. The inner end of the tractor bar is bifurcated and engages a shaft 20. This shaft 20 is carried by a pair of arms 21 projecting forwardly from the loading platform. To limit the movement of the tractor bar in the guide-way, the former is provided with a pair of stops 22 and 23. Centrally mounted on the shaft 20 is a locking lever 24 provided with notches 25 and 26. These notches are adapted to engage with a pin 27 carried by the post. The forward end of the lever 24 is upturned and provided with an eye 28 engaging one end of spring 29, the other end of which is attached to the post 18. The spring is of such length that its tension will support the weight of the locking lever when the parts are in position shown in Figure 1. It will thus hold notch 26 out of engagement with pin 27. Attached to the eye 28 are flexible connections 30 and 31, the latter of which extends downwardly and passes through a staple 32 on the tractor bar. These connections extend to a point within control of the driver of the tractor.

The operation of my loading device is as follows: The normal position of the parts, when moving forward, is as shown in Figure 1. To load the device the tractor is reversed so as to push instead of pull the device. The first result of this reversal is to move the tractor bar from the position shown in Figure 1 to that shown in Figure 2, thus tilting the loading platform to bring the rear ends of the rake teeth into contact with the ground. This movement of the tractor bar relieves the tension of spring 29 so that notch 25 engages with pin 27, thus positively locking the platform in tilted position during the loading operation. Loading is accomplished by continued backing of the device until the rake teeth 16 have picked up the desired amount of material. Before starting forward, connection 30 is actuated to release the locking lever from pin 27 so that the first result of the pull on the tractor bar is to move the platform into hauling position. To unload the device it is backed to tilt the platform and then moved forward to withdraw the inclined platform from under the load and deposit it upon the ground. If, during the hauling operation, it is found necessary to back the device, connection 31 is operated to engage notch 26 with pin 27 so that such backing may be accomplished without tilting the platform. In the loading operation in the field it is desirable that the wheels operate as caster wheels to permit square turns when necessary. In the hauling operation on the road, either one pair or all four wheels should have their vertical trunnions locked against rotation to avoid the whipping action which would be likely to result from rapid travel on caster wheels.

Having fully described my invention, what I claim as new and desire to secure by Letters Patent of the United States:

1. In a device of the class described, the combination with a frame mounted upon wheels, of a loading platform pivotally mounted in said frame to swing from an approximately horizontal to an inclined position, a tractor connection for imparting movement to the frame, said connection being attached to the platform whereby the latter is automatically swung to inclined position when movement is imparted to the frame in a rearward direction, and means automatically locking the connection to maintain the platform in tilted position when the frame is moved in a forward direction.

2. In a device of the class described, the combination with a frame mounted upon wheels, of a loading platform pivotally mounted in said frame to swing from an approximately horizontal to an inclined position, a support carried on the end of said frame and forming a guide-way, a tractor bar moving in said guide-way, said tractor bar being pivoted to the platform, and a locking lever pivoted to the platform to maintain the latter in its tilted position.

3. In a device of the class described, the combination with a frame mounted upon wheels, of a loading platform pivotally mounted in said frame to swing from an approximately horizontal to an inclined position, a support carried on the end of said frame and forming a guide-way, a tractor bar moving in said guide-way, said tractor bar being pivoted to the platform, a locking lever pivoted to the platform, automatically-operated means actuating said locking lever to maintain the platform in inclined position, and manually-operated means actuating the lever to maintain the platform in approximately horizontal position.

4. In a device of the class described, the combination with a frame mounted upon wheels, of a loading platform pivotally mounted in said frame to swing from loading to hauling position, said platform extending substantially the entire length of the frame, load engaging means carried by the platform at one end of the device, a tractor connection at the other end of the device, said connection operating to move the platform from hauling to loading position when the device is pushed by the tractor and from loading to hauling position when it is pulled thereby, and means for locking the platform against movement from loading to hauling position, whereby the device may be unloaded by pulling movement.

5. In a device of the class described, the combination with a frame mounted upon wheels, of a loading platform pivotally mounted in said frame to swing from loading to hauling position, said platform extending substantially the entire length of the frame, load engaging means carried by the platform at one end of the device, a tractor connection at the other end of the device, said connection operating to move the platform from hauling to loading position when the device is pushed by the tractor and from loading to hauling position when it is pulled thereby, means for locking the platform against movement from loading to hauling position, whereby the device may be unloaded by pulling movement, and means for locking the platform against movement from hauling to loading position, whereby the tractor attached to said device may be backed without disturbing a load carried on said device.

DANIEL C. HINDS.